Patented Sept. 20, 1949

2,482,207

UNITED STATES PATENT OFFICE 2,482,207

PROCESS FOR MAKING STYRENE AND SUBSTITUTED STYRENES

William M. Quattlebaum, Jr., Charleston, W. Va., assignor to Carbide and Carbon Chemicals Corporation, a corporation of New York No Drawing. Application July 9, 1946, Serial No. 682,297

8 Claims. (Cl. 260—650)

In the copending application, Serial No. 458,736, filed September 17, 1942 by me and W. J. Toussaint, entitled "Process for making olefines," now Patent No. 2,407,291 we have shown that carbonyl compounds capable of keto-enol tautomerism are deoxygenated to the corresponding olefines when they are passed over a silica gel catalyst together with an alcohol capable of dehydrogenation to a carbonyl compound, the alcohol being simultaneously reduced to an aldehyde or ketone. In our previous joint application, we specifically applied this reaction to the production of mono- and diolefines, including the formation of butadiene from crotonaldehyde and ethanol, but we also demonstrated that styrene could be formed from acetophenone and ethanol by this reaction. In our copending application, Serial No. 682,298, filed simultaneously herewith, as a continuation-in-part of our joint application Serial No. 458,736, we claim the process of making styrene and its derivatives from acetophenone, or its derivatives, and alcohols in the presence of silica gel. Although silica gel is the preferred catalyst for this reaction, I have found that acetophenone and substituted acetophenones can be converted to styrene and substituted styrenes in the presence of a certain class of catalysts. This finding was made independently of our joint discovery of the outstanding effectiveness of silica gel as a catalyst for the same reaction.

According to the present invention, acetophenone and substituted acetophenones, such as the chloroacetophenones, together with primary or secondary alcohols, are passed over dehydrating-dehydrogenating catalysts, to form styrene or substituted styrenes, such as the chlorostyrenes, by a deoxygenation reaction. By a "dehydrating-dehydrogenating catalyst" is meant a catalyst capable of both dehydrating and dehydrogenating ethanol vapors at elevated temperatures of about 300° to 400° C. to form gas mixtures containing at least some hydrogen and at least some ethylene. Materials which give only ethylene from ethanol, such as thorium oxide, $ThO_2$, are excluded because they are wholly ineffective as catalysts for the present reaction. For similar reasons, materials which give only hydrogen from ethanol, such as tin oxide, $SnO_2$, are also excluded. In general, the present classification of dehydrating-dehydrogenating catalysts follows that of Sabatier; see Rideal and Taylor "Catalysis in Theory and Practice" p. 356–357 (1926) and Sabatier, "Catalysis in Organic Chemistry," p. 252 (1923). However, materials, such as alumina are herein considered to be dehydrating-dehydrogenating catalysts because they do not have a dehydrating action exclusively according to Sabatier's tests.

Dehydrating-dehydrogenating catalysts other than silica gel which are effective catalysts for the present deoxygenation reaction include alumina, titania, zirconia, molybdenum oxide, tantalum oxide and magnesium silicate. Some of these catalysts, such as alumina gel, silica gel and magnesium silicate may be obtained commercially, and others may be prepared according to known methods. For instance, catalysts composed of metal oxides supported on inert carriers may be prepared according to Craver, U. S. Patent No. 1,914,558.

The deoxygenation reaction of this invention may be illustrated by the following general equation:

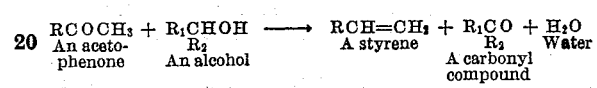

where R is an aromatic radical having a single benzenoid ring, $R_1$ is an alkyl radical and $R_2$ is hydrogen or an alkyl radical. As examples of acetophenones may be mentioned acetophenone, ortho, meta, and para chloroacetophenone, the various dichloroacetophenones, the trichloroacetophenones, ortho, meta and para methyl acetophenone, and the various dimethyl acetophenones. Any of the typical primary or secondary aliphatic alcohols may be utilized in the deoxygenation reaction, such as ethanol, isopropanol, butanol, secondary butyl alcohol, pentanol, hexanol and the like. In general, it is preferable to employ a substantial molar excess of the alcohol, for instance three to nine moles of the alcohol per mole of the acetophenone. After passage over the catalyst, the unchanged alcohol may be recovered and recycled. Most of the alcohol consumed is converted to the corresponding carbonyl compound, which is usually more valuable than the alcohol. If not, the carbonyl compound can be easily hydrogenated to form the alcohol. Very little alcohol is lost by dehydration to an olefine, although secondary alcohols are somewhat more easily dehydrated than primary alcohols.

It is not essential to use pure acetophenones in the deoxygenation reaction. Mixtures of acetophenones and the corresponding aromatic alcohols, such as may be obtained by oxidizing ethylbenzene or its derivatives are entirely suitable.

The temperature at which the deoxygenation reaction may be carried out may vary from about 200° to about 500° C., with the preferred temperatures being 300° to 400° C. In general, the yield increases with the temperature employed, but it is preferable to operate at temperatures lower than those at which the maximum yield is obtainable, as shown in the examples, in order to avoid side-reactions and to increase the efficiency of the process. The time of contact of the reactants with the catalyst may be varied, but, as a rule, a feed rate of 0.5 to 1.5 volumes of liquid reactants per volume of catalyst per hour is suitable. The reactants are, of course, vaporized before they pass over the catalyst. Thus, the time of contact of the reactant vapors with the catalyst may be about 1 to 4 seconds.

The following procedure was followed in carrying out the deoxygenation reactions of the specific examples.

General procedure

The reaction chamber consisted of a vertical, one-inch, stainless steel tube in which 300 c. c. of the catalyst of suitable particle size, usually 4 x 8 mesh, were placed. The catalysts employed were commercial types, except the supported metal oxides which were prepared according to Examples 7, 20 and 22 of Craver U. S. Patent No. 1,914,558. The reaction zone was preceded by a preheating section containing 150 c. c of "Filtros," an inert form of silica. The reaction tube was heated by means of a jacket containing a heating fluid.

In starting a run the temperature of the catalyst bed was raised slowly, commencing at about 250° C., while a mixture of the acetophenone and the alcohol was introduced usually at a rate of about 300 c. c. of liquid per hour at the top of the tube. The vapors emerging at the bottom of the tube were condensed, and a sample of the product titrated at intervals to determine the amount of unsaturation, and hence the amount of reaction. When a temperature was reached at which a good conversion to the styrene compound was indicated, the run was continued at this temperature, using weighed amounts of starting materials. The product formed during the quantitative part of the run was collected and carefully analyzed by distillation.

Example 1.—Styrene-magnesium silicate

A mixture of 720 grams of acetophenone and 1175 grams of ethanol containing small amounts of water (about 7%) and acetaldehyde (about 1%) was vaporized at the rate of 300 c. c. of liquid per hour. The vapors were passed over 300 c. c. of commercial magnesium silicate pellets at 300° C. The product was distilled through a highly efficient rectifying column which made possible the removal of an ethanol fraction containing only a small amount of styrene. A total of 194 grams of styrene (including that in the ethanol fraction) was obtained, and 392 grams of acetophenone were recovered. The yield and efficiency were thus 31% and 68% respectively. The efficiency is defined as the ratio of the moles of acetophenone converted to styrene to the total moles of acetophenone reacted. The purity of the styrene was 97%.

Example 2.—Styrene-zirconium oxide

A mixture of the same composition as the one used in Example 1 was vaporized at the rate of 300 c. c. of liquid per hour and the vapors passed over 300 c. c. of zirconium oxide supported on "Filtros." The temperature employed was 350° C. Distillation of the product demonstrated that styrene was produced under these conditions in a yield of 10% and at an efficiency of 66%. The purity of the styrene was 98.5%.

Example 3.—Styrene-molybdenum oxide

A mixture of 720 grams of acetophenone and 1175 grams of ethanol containing small amounts of water and acetaldehyde were vaporized at the rate of 300 c. c. of liquid per hour and the vapors were passed over 300 c. c. of molybdenum oxide supported on "Filtros" maintained at 350° C. Styrene was obtained under these conditions in a yield of 9% and at an efficiency of 78%. More ethanol was dehydrated to ethylene than occurred with the catalysts of the previous examples. The purity of the styrene was greater than 95%.

Example 4.—Styrene-tantalum oxide

A mixture of the same composition as used in Example 3 was passed at the same space velocity over tantalum oxide supported on "Filtros" maintained at 300° C. Styrene of 99% purity was obtained in a yield of 18% and at an efficiency of 62%.

Example 5.—Monochlorostyrene-tantalum oxide

Six gram-moles of monochlorophenyl methyl ketone and 24 gram-moles of ethanol containing small amounts of water and acetaldehyde were vaporized at the rate of 295 c. c. of liquid per hour. The vapors were conducted over 300 c. c. of tantalum oxide supported on "Filtros." The temperature was held at 350° C. Upon rectification of the product in the usual way, a 26% yield of chlorostyrene of high purity was obtained, with an efficiency based on chlorophenyl methyl ketone of 84%.

Example 6.—Monochlorostyrene-alumina gel

To 618 grams of monochlorophenyl methyl ketone was added 1175 grams of ethanol containing small amounts of water and acetaldehyde. This mixture, which had a molar ratio of ethanol to ketone of approximately 6 to 1, was vaporized at the rate of 310 c. c. of liquid per hour and the vapors led over 300 c. c. of commercial alumina gel maintained at a temperature of 350° C. Distillation of the product yielded 461 grams of chlorostyrene higher in purity than 98%. The conversion under these conditions was so high that some by-products were formed and little unreacted ketone was recovered. The yield was 82% of the theoretical amount.

Example 7.—Monochlorostyrene-titanium oxide

The procedure of Example 6 was followed using 300 c. c. of commercial acid-washed titanium oxide pellets in place of the alumina gel. The chlorostyrene obtained was somewhat lower in purity, the yield in this case being 46%.

Styrene and the chlorostyrenes prepared in accordance with the above examples are useful materials in the preparation of synthetic resins. The process of this invention is particularly valuable for producing styrene and its derivatives for this purpose since the monomers are of high purity. The deoxygenation reaction is a particularly useful reaction for producing the chlorostyrenes since these materials are difficult to prepare by the usual methods which are employed for producing styrene. These methods involve the hydrogenation of acetophenone and subsequent dehydration of the phenyl methyl carbinol or the dehydrogenation of ethylbenzene. The former process is not suitable for converting chloroacetophenones to chlorostyrenes because the hydrogenation catalysts employed in the hydrogenation step become poisoned. The dehydrogenation of ethylchlorobenzenes is not a satisfactory process because it is extremely difficult to separate the chlorostyrenes from the ethylchlorobenzenes. This is because isomers are present, the materials to be separated differ only slightly in boiling points, and the chlorostyrenes polymerize readily during distillation. With regard to the preparation of styrene from acetophenone, the present process has the advantage that it eliminates the hydrogenation step.

Modifications of the invention, other than as described in the specific examples, may be made without departing from the scope of the invention as defined in the appended claims.

I claim:

1. Process for making a styrene compound of the group consisting of styrene and chlorostyrenes which comprises passing the vapors of one of the group consisting of acetophenone and ring-substituted chloroacetophenones and an aliphatic monohydric alcohol capable of dehydrogenation to a carbonyl compound in the ratio of three to nine moles of the alcohol per mole of the acetophenone compound over a dehydrating-dehydrogenating catalyst at an elevated temperature, and recovering from the reaction products a styrene compound and an aliphatic carbonyl compound corresponding to the dehydrogenation product of said alcohol.

2. Process for making styrene which comprises passing the vapors of acetophenone and an aliphatic monohydric alcohol capable of dehydrogenation to a carbonyl compound in the ratio of three to nine moles of the alcohol per mole of the acetophenone over a dehydrating-dehydrogenating catalyst at a temperature of about 200° to about 500° C., and recovering from the reaction products styrene and an aliphatic carbonyl compound corresponding to the dehydrogenation product of said alcohol.

3. Process for making a chlorostyrene which comprises passing the vapors of a ring-substituted chloroacetophenone and an aliphatic monohydric alcohol capable of dehydrogenation to a carbonyl compound in the ratio of three to nine moles of the alcohol per mole of the chloroacetophenone over a dehydrating-dehydrogenating catalyst at a temperature of about 200° to about 500° C., and recovering from the reaction products a chlorostyrene and an aliphatic carbonyl compound corresponding to the dehydrogenation product of said alcohol.

4. Process for making a monochlorostyrene which comprises passing vapors of a ring-substituted monochloroacetophenone and an aliphatic monohydric alcohol capable of dehydrogenation to a carbonyl compound in the ratio of three to nine moles of the alcohol per mole of the monochloroacetophenone over a dehydrating-dehydrogenating catalyst at a temperature of about 200° to about 500° C., and recovering from the reaction products a monochlorostyrene and an aliphatic carbonyl compound corresponding to the dehydrogenation product of said alcohol.

5. Process for making a styrene compound of the group consisting of styrene and chlorostyrenes which comprises passing the vapors of one of the group consisting of acetophenone and ring-substituted chloroacetophenones and an aliphatic monohydric alcohol capable of dehydrogenation to a carbonyl compound in the ratio of three to nine moles of the alcohol per mole of the acetophenone compound over a catalyst comprising tantalum oxide at a temperature of about 200° to 500° C. and recovering from the reaction products a styrene compound and an aliphatic carbonyl compound corresponding to the dehydrogenation product of said alcohol.

6. Process for making a styrene compound of the group consisting of styrene and chlorostyrenes which comprises passing the vapors of one of the group consisting of acetophenone and ring-substituted chloroacetophenones and an aliphatic monohydric alcohol capable of dehydrogenation to a carbonyl compound in the ratio of three to nine moles of the alcohol per mole of the acetophenone compound over a catalyst comprising zirconium oxide at a temperature of about 200° to about 500° C., and recovering from the reaction products a styrene compound and an aliphatic carbonyl compound corresponding to the dehydrogenation product of said alcohol.

7. Process for making a styrene compound of the group consisting of styrene and chlorostyrenes which comprises passing the vapors of one of the group consisting of acetophenone and ring-substituted chloroacetophenones and an aliphatic monohydric alcohol capable of dehydrogenation to a carbonyl compound in the ratio of three to nine moles of the alcohol per mole of the acetophenone compound over a catalyst comprising magnesium silicate at an elevated temperature, and recovering from the reaction products a styrene compound and an aliphatic carbonyl compound corresponding to the dehydrogenation product of said alcohol.

8. Process for making a cholrstyrene which comprises passing the vapors of a ring-substituted chloroacetophenone and ethanol in the ratio of three to nine moles of ethanol per mole of the chloroacetophenone over a catalyst comprising tantalum oxide at a temperature of about 300° to about 400° C., and recovering from the reaction products a chlorostyrene and acetaldehyde.

WILLIAM M. QUATTLEBAUM, Jr.

REFERENCES CITED

The following references are of record in the file of this patent:

UNITED STATES PATENTS

| Number | Name | Date |
|---|---|---|
| 1,877,203 | Schoeller et al. | Sept. 13, 1932 |
| 2,204,978 | Bartlett | June 18, 1940 |
| 2,407,291 | Quattlebaum et al. | Sept. 10, 1946 |
| 2,421,361 | Toussaint et al. | May 27, 1947 |
| 2,423,681 | Butterbaugh et al. | July 8, 1947 |

FOREIGN PATENTS

| Number | Country | Date |
|---|---|---|
| 538,353 | Great Britain | July 31, 1941 |

OTHER REFERENCES

Sabatier et al., Bull. de la Soc. Chim. Ser. 4, vol. 15, 227 (1914).